US008936296B1

(12) United States Patent
Fedders

(10) Patent No.: US 8,936,296 B1
(45) Date of Patent: Jan. 20, 2015

(54) UTV (UTILITY TERRAIN VEHICLE) SPLIT FRONT WINDSHIELD

(71) Applicant: Kenneth Oliver Fedders, Eagle, ID (US)

(72) Inventor: Kenneth Oliver Fedders, Eagle, ID (US)

( * ) Notice: Subject to any disclaimer, the term of this patent is extended or adjusted under 35 U.S.C. 154(b) by 0 days.

(21) Appl. No.: 14/053,785

(22) Filed: Oct. 15, 2013

Related U.S. Application Data

(60) Provisional application No. 61/795,307, filed on Oct. 15, 2012.

(51) Int. Cl.
*B60J 1/06* (2006.01)
*B60J 1/18* (2006.01)
*B60J 1/02* (2006.01)

(52) U.S. Cl.
CPC ........................................ *B60J 1/02* (2013.01)
USPC ............................. 296/85; 296/86; 296/190.1

(58) Field of Classification Search
CPC .................................... B60J 1/085; B60J 1/06
USPC ............ 296/85, 86, 87, 88, 96.2, 79, 107.07, 296/190.1; 280/756
See application file for complete search history.

(56) References Cited

U.S. PATENT DOCUMENTS

| 2,462,976 | A  | * | 3/1949 | King ................................. 24/276 |
| 5,385,380 | A  |   | 1/1995 | Heavner |
| 6,257,653 | B1 | * | 7/2001 | Swersky .................... 296/180.1 |
| 6,786,526 | B1 |   | 9/2004 | Blalock |
| 7,007,999 | B1 | * | 3/2006 | Schneller ......................... 296/90 |
| 7,044,530 | B1 |   | 5/2006 | Hahne |
| 7,380,860 | B2 | * | 6/2008 | Dolan ............................. 296/86 |
| 7,828,359 | B2 |   | 11/2010 | Caprio |
| 2001/0030447 | A1 | * | 10/2001 | Schmitt ....................... 296/180.5 |
| 2008/0106115 | A1 | * | 5/2008 | Hughes .......................... 296/102 |
| 2009/0229094 | A1 | * | 9/2009 | Reese .............................. 24/530 |
| 2011/0254314 | A1 | * | 10/2011 | Renard ....................... 296/190.1 |
| 2012/0074282 | A1 | * | 3/2012 | Willey ...................... 248/226.11 |

* cited by examiner

*Primary Examiner* — Jason S Morrow
(74) *Attorney, Agent, or Firm* — Your Intellectual Property Matters, LLC; Robert A. Frohwerk

(57) ABSTRACT

A two-piece front windshield for a Utility Terrain Vehicle (UTV) has a lower section of the windshield having a forward lip at its upper edge. The lower windshield is attached to the front of the vehicle roll cage frame. A removable upper section of the windshield is attached to the front of the vehicle roll cage frame above the lower windshield supported by the forward lip and held in place by a quick disconnect clamp system with the ability to be quickly removed and repositioned into a rear storage channel behind the vehicle seats to be used as a rear window. The upper section of the windshield can be placed back into the front windshield position at anytime.

10 Claims, 8 Drawing Sheets

Side view of lower windshield from drivers side of vehicle

UTV (UTILITY TERRAIN VEHICLE) SPLIT FRONT WINDSHIELD

RELATED APPLICATIONS

This application claims the benefit of U.S. provisional patent application No. 61/795,307 filed on Oct. 15, 2012 and entitled "UTV vehicle 2 piece front windshield with the upper section of the windshield being removable and then placed into a storage channel behind the vehicle occupants to then be used as a rear window. The said upper section of the windshield can be placed back into the front windshield position at anytime."

BACKGROUND OF THE INVENTION

Field of Endeavor to which this Invention Pertains

This invention pertains to UTV (utility terrain vehicle) split windshield assemblies that are quickly removable and have an onboard storage area that allows the upper section of the split windshield to be placed in a protective area on the UTV to prevent damage to the windshield.

While riding in a open motorized vehicle such as UTV's, "Utility Terrain Vehicles", such as the Polaris RZR and other UTV's, the occupants have no means of protection from wind, dust., rain, snow or any debris that could otherwise end up in the cab of the vehicle.

The inventor has developed a method for the occupants to be protected from these elements by the use of a split windshield while still having the option of enjoying a partial open area for optimal visibility and fresh air at the operator's discretion. A split windshield with the lower section of the windshield being attached to the front of the lower section of the utility terrain vehicle roll cage frame by clamps and the upper section of the windshield also being held in place on the front of the upper section of the vehicle roll cage frame by the use of a quick disconnect clamp system that uses removable rubber coated retainer nuts to hold the upper windshield in place.

These rubber coated retainer nuts can be quickly removed to allow the upper windshield to be removed from its position as the upper windshield. As this removal could occur in a remote location away from any place to store the upper windshield, a channel with a clamp attachment on each end of the channel is located and clamped on a rear lower horizontal roll cage bar behind the occupant's seats and in a rear window position. The upper windshield could then be placed in this channel and secured by the same type of quick disconnect clamp system as used to hold the upper windshield in its forward windshield position. These clamps would be attached to the upper rear horizontal roll cage bar with the threaded portion of the clamp bolt forward to be used to enter the pre-drilled holes in the upper windshield and then to be secured by the use of removable rubber coated anchor nuts as part of the quick disconnect clamp system. In this position the upper windshield could then be used as a vehicle rear window. At the discretion of the operator, the upper windshield could be removed from this storage position and again placed in the upper windshield position at any time.

Prior art of split windshields for vehicles have had a problem with the hinges used to hold the lower and upper windshields together and also with the latches and devices used to hold the upper panel in a open and closed position.

Prior art for vehicles also has the upper windshield of the split windshield assembly in a bottom hinged position to the top of the lower half of the windshield that when it is open it is laying forward onto the vehicle hood and allows the dust, wind, rain, and other elements to actually ramp up the lowered upper windshield and directs all of the elements into the vehicle driver/passenger compartments.

Another version of the split windshield assembly is again a hinged upper windshield that is hinged at the top of the upper windshield and uses a slide assembly on each side of the upper windshield to move and hold the bottom of the upper windshield out forward and away from the lower half of the split windshield assembly. This type of split windshield assembly is faulted by the shorter distance that it can move out due to the limited distance that the upper windshield slide assemblies can move. Also, this type of split windshield causes more restricted visibility through the front of the windshield due to the lower section of the upper windshield creating another line of distraction in the operator's view.

SUMMARY OF THE INVENTION

This invention relates to a vehicle windshield arrangement of a horizontal split windshield that consists of a lower windshield and a removable upper windshield that could, by the use of the lower windshield only, provide an open area above the lower windshield for optimal visibility and fresh air; or with the use of both the lower and upper windshields, provide a complete front windshield that would provide protection to the vehicle occupants by deflecting and blocking most, if not all, of rain, snow, wind, dust and other debris.

The split windshield of the invention removes the upper windshield from the front of the vehicle and places it in a rear window position therefore eliminating the ramping effect of all of the weather and local conditions of the elements and also is not creating any restricted visibility to the vehicle operator.

The invention also provides for a storage location for the upper windshield when not being used as a windshield and also provides a secondary benefit by using the upper windshield as a vehicle rear window.

The principle object of the invention is to give the operator and occupant the options of using the lower windshield only and enjoy the fresh air and optimal visibility or using both the upper and lower windshields and blocking unwanted wind, dust, rain, snow and debris. The present invention uses no hinges to hold the upper and lower windshields together and does not need to have latches or devices to hold the upper windshield hinged in a closed or open position.

Another object of the invention is to provide a UTV split windshield that is easy to install as an after market item and will provide a UTV operator with a reliable alternative to the use of a lower only windshield or a split hinged upper and lower windshield.

Another object of the invention is to provide a storage area to place the quick disconnected upper windshield into when removed from the windshield position at the front of the vehicle and place it in a rear window position so as to store and also to prevent any damage to the upper windshield.

DESCRIPTION OF THE DRAWINGS

The Invention may take form in the arrangement of component parts that are herein shown as preferred embodiments and will be described in detail and illustrated in the accompanying drawings which form a part hereof.

Figure 1:
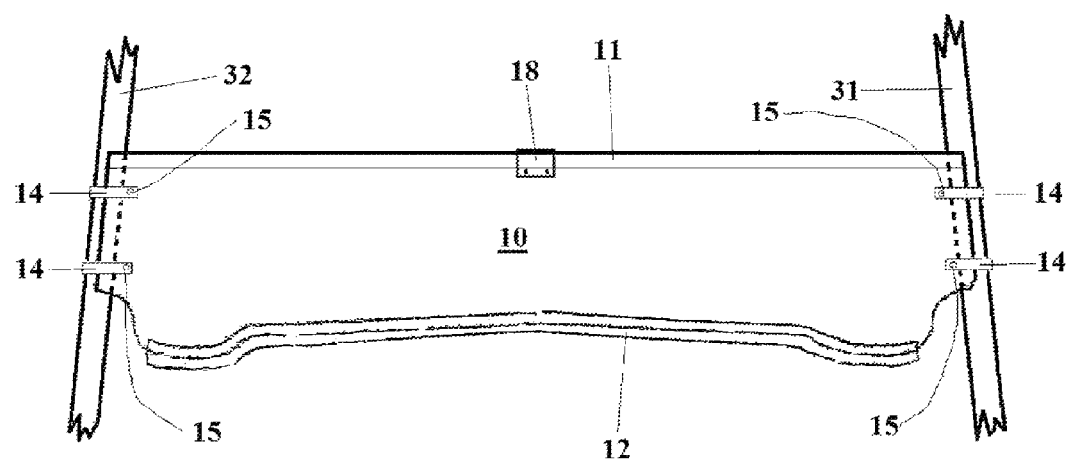
FIG. 1 shows a front plan perspective view of the lower windshield of the Split Windshield for UTVs.

DRAWING REFERENCE NUMERALS 10 lower windshield
11 1 inch, 45 degree forward lip
12 rubber seal
13 lower windshield clamp assembly
14 clamp, 1¾"
15 bolt, ¾ inch
16 nyloc nut
17 bonded washer
18 upper windshield support
20 upper windshield
21 upper windshield clamp assembly
23 bolt, 1 inch
24 hex nut
25 rubber coated retainer nut
26 upper windshield storage channel
27 clamp, 1⅜"
28 clamp, 1½"
30 vehicle
31 front vertical roll cage bar driver's side
32 front vertical roll cage bar passenger side
33 rear vertical roll cage bar on driver's side
34 rear vertical roll cage bar on driver's side
35 rear upper horizontal roll cage bar
36 rear lower horizontal roll cage bar

DETAILED DESCRIPTION

FIG. 1 shows a front view of the lower windshield 10 with the 1 inch, 45 degree forward lip 11 the full width at the top of the lower windshield 10 as it would be installed on the vehicle and the upper windshield support 18 attached to the middle of the 1 inch, 45 degree forward lip 11. This 1 inch, 45 degree forward lip 11 is used for windshield strength and also to assist in deflecting wind and dust. This figure also shows the clamps 14 and the bolts 15 necessary for installation to secure the lower windshield to the vertical roll cage bar 31 on the driver's side of the vehicle and the vertical roll cage bar 32 on the passenger's side of the vehicle. It also shows the rubber seal 12 between the bottom of the lower windshield 10 and the hood of the vehicle 30 used to prevent scratching the vehicle hood and also to seal the wind, dust, rain, snow and debris from going between the lower windshield 10 and the hood of the vehicle 30.

Figure 2:
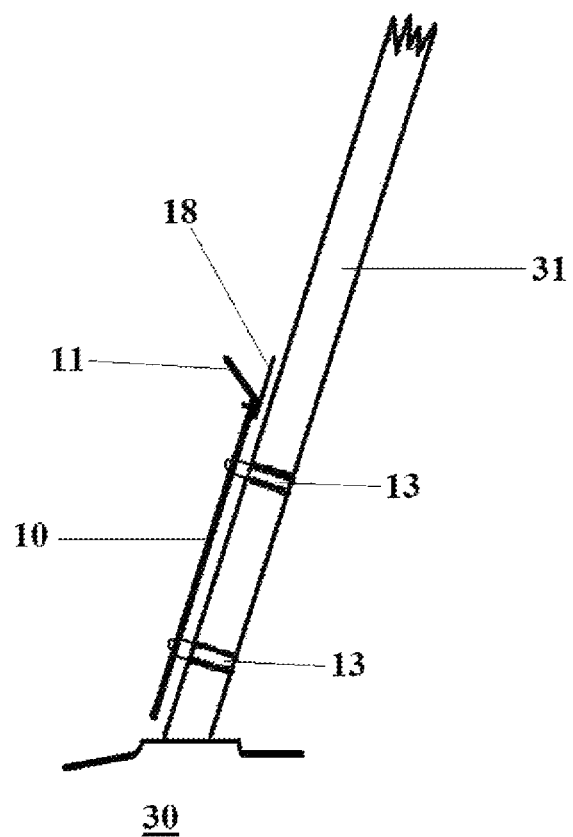
FIG. 2 shows a left side plan perspective view of a major component of the Split Windshield for UTVs.

FIG. 2 shows a driver side view of the lower windshield 10 with the upper windshield support 18 attached. This figure is shown for location purposes and for viewing of the 1 inch 45 degree forward lip 11 at the top of the lower windshield. It also shows the clamp assemblies 13 with the bolt head 15 forward attached to the vertical roll cage bar 31 that is attached to the vehicle 30.

Figure 3:
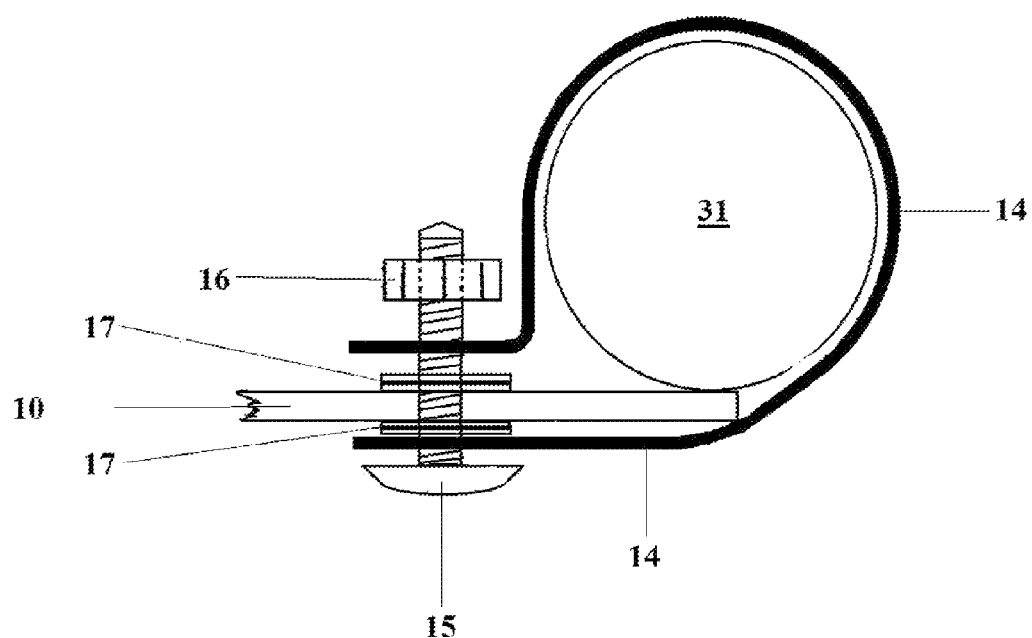
FIG. 3 shows a top plan perspective view of one embodiment of the coupling assembly for the lower windshield of the invention.

FIG. 3 shows an exploded top view of the lower windshield clamp assembly 13 attached to the vertical roll cage bar 31 and the lower windshield 10 with a view of the order of installation of the bolt 15 through the hole in the clamp 14, through the hole in the bonded washer 17, through the hole in the lower windshield 10, through the bonded washer 17, through the second hole in the clamp 14, and through the hole in the hex nut 16.

Figure 4:
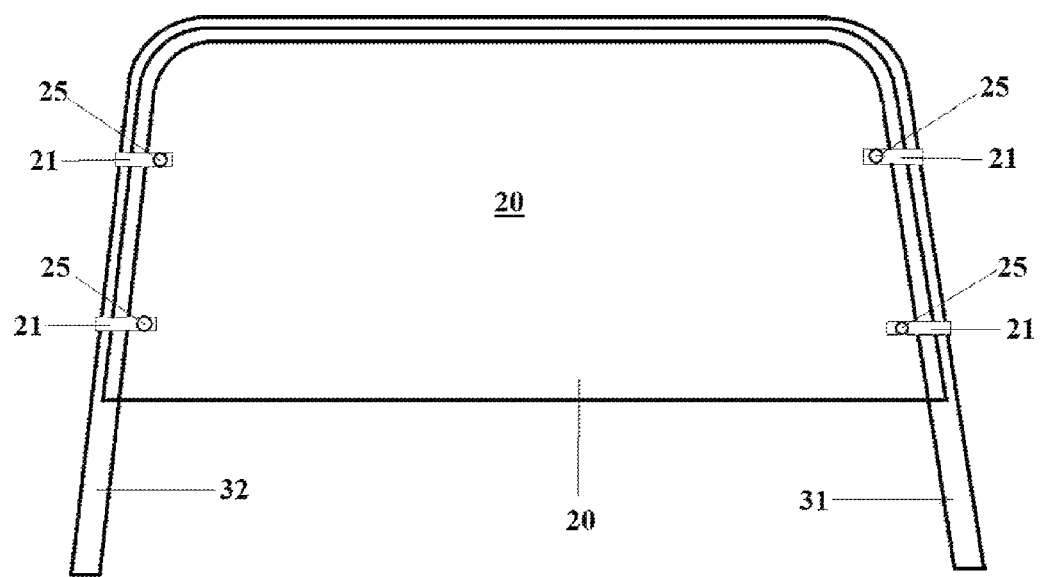
FIG. 4 shows a front plan perspective view of the upper windshield of the split windshield assembly.

FIG. 4 shows a front view of the upper windshield 20 as it would be installed on the vehicle 30 by use of the clamp assembly 21 which consists of the clamp 22, bolt 23, hex nut 24, and the removable rubber coated retainer nuts 25. This drawing shows the four clamps 21 necessary to secure the upper windshield 20 to the driver side front vertical roll cage bar 31 and the passenger side front vertical roll cage bar 32 of the vehicle 30 with the threaded portion of the bolt 23 forward to be used to enter the pre-drilled holes in the upper windshield 20 and then to be secured by the use of the removable rubber coated retainer nuts 25 as part of the quick disconnect clamp system.

Figure 5:
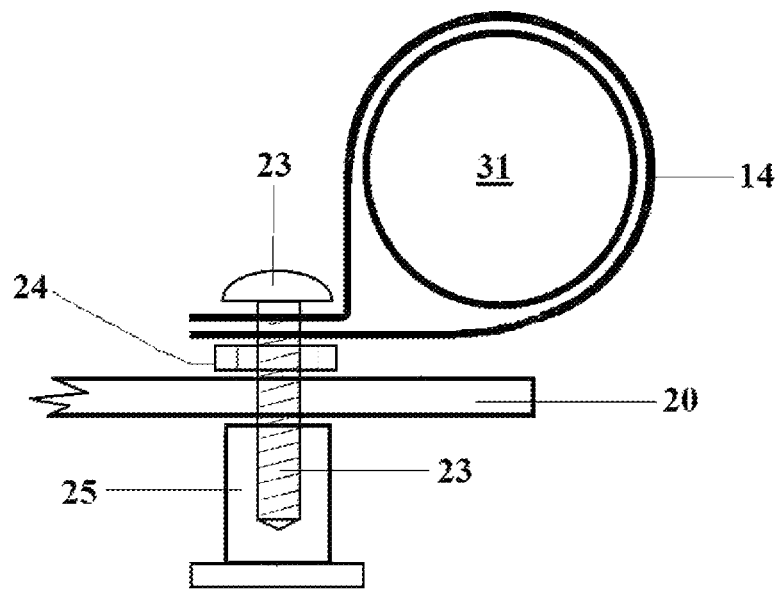
FIG. 5 shows a top plan perspective view of one embodiment of the coupling assembly for the upper windshield and storage assembly of the invention.

FIG. 5 shows an exploded top view of the upper windshield quick disconnect clamp system with a view of the hardware and the order of installation. Shown is an exploded top view of the upper windshield clamp assembly 21 attached to the vertical roll cage bar 31 and the upper windshield 20 with a view of the order of installation of the bolt 23 through the hole in the clamp 22, through the hole in the hex nut 24, through the hole in the upper windshield 20, and through the hole in the removable rubber coated retainer nut 25.

Figure 6:
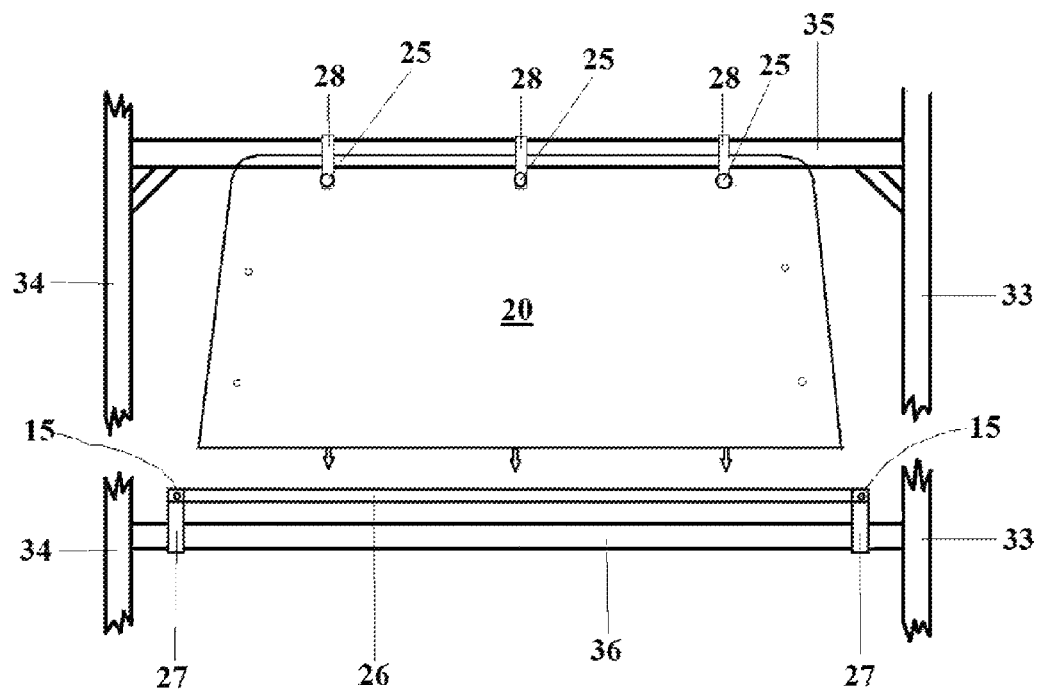
FIG. 6 shows a front plan perspective view of the storage assembly for the upper windshield of the Invention.

FIG. 6 shows a front view of the upper windshield storage channel 26 as it would be installed on the lower rear horizontal roll cage bar 36 of the vehicle 30 by use of the clamp assembly 21 which consists of the clamp 27, bolt 15, and nyloc nut 16. The channel would be installed by use of clamp 27 attached to each end of the upper windshield storage channel 26 and then clamped on the lower rear horizontal roll cage bar 36 behind the vehicle seats. It also shows the upper storage clamp assembly on the upper rear horizontal roll cage bar 35. The upper storage clamps 28 are secured to the upper rear horizontal roll cage bar 35 with the clamp bolt 23, and hex nut 24 with the threaded portion of the bolt facing forward to be used to enter the pre-drilled holes in the upper windshield 20 and then to be secured by the use of removable rubber coated retainer nuts 25 as part of the quick disconnect clamp system. The bottom of the windshield 20 would be secure by setting in the upper windshield storage channel 26. View FIG. 5 for a view of a description of the method used for the clamps on the upper rear horizontal roll cage bar 35.

Figure 7:
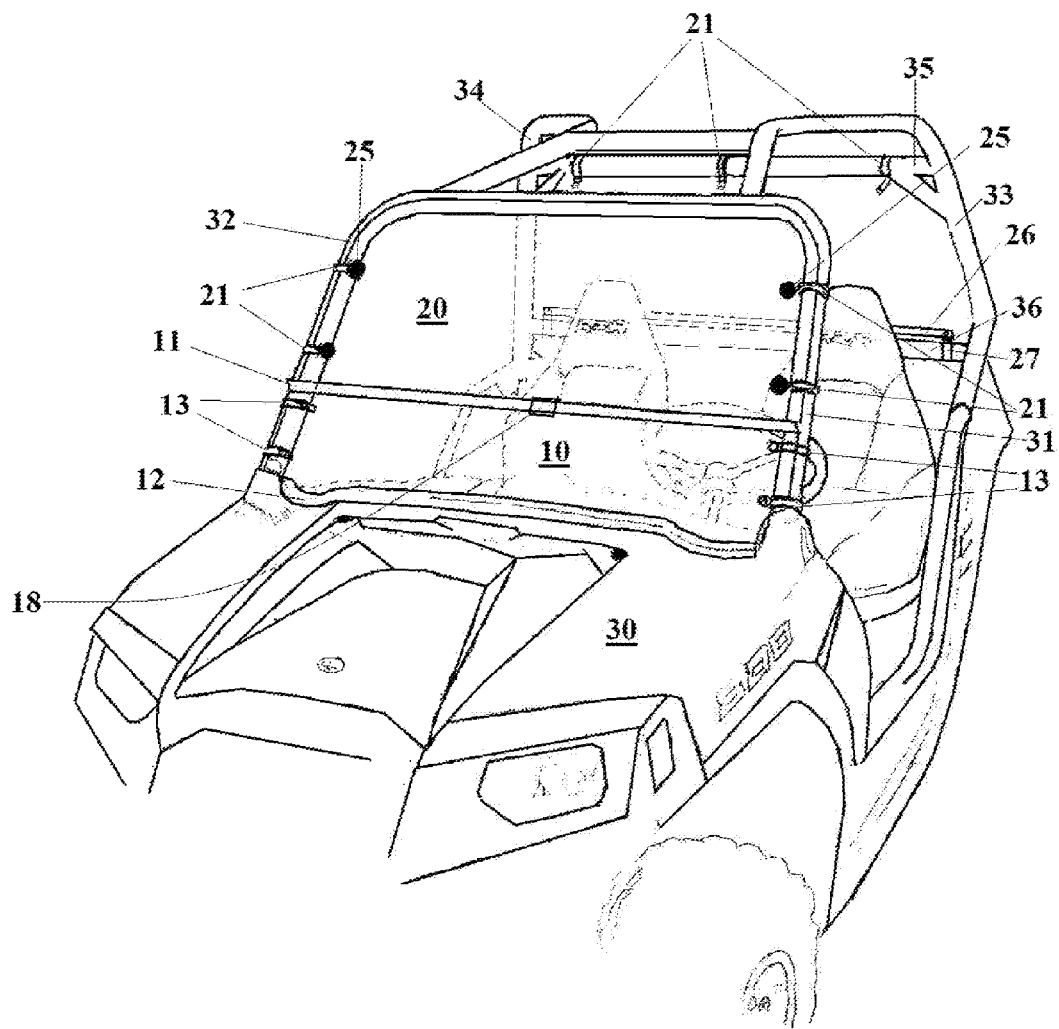
FIG. 7 shows a front plan perspective view of a UTV (Utility Terrain Vehicle) split front windshield with upper and lower assembly installed.

FIG. 7 shows a front view of the two-piece split windshield of the invention installed on the vehicle 30 with the 1 inch 45 degree lip 11 the full width at the top of the lower windshield 10 and the upper windshield support 18. It shows the four clamp assemblies 13 necessary to secure the lower windshield 10 to the front and rear vehicle roll cage bars 31 and 32 using the "bolt head" forward method of screws used in the clamps. It also shows the rubber seal 12 between the bottom of the lower windshield 10 and the hood of the vehicle 30 used to prevent scratching the vehicle hood and also to seal the wind, dust, rain, snow and debris from going between the lower windshield 10 and the hood of the vehicle 30. This figure also shows the four clamp assemblies 21 necessary to secure the upper windshield 20 to the front and rear vehicle roll cage bars 31 and 32 using the "threaded portion of the bolt" forward to be used to enter the pre-drilled holes in the upper windshield 20 and then to be secured by removable rubber coated retainer nuts 25 as part of the quick disconnect clamp system.

Figure 8:
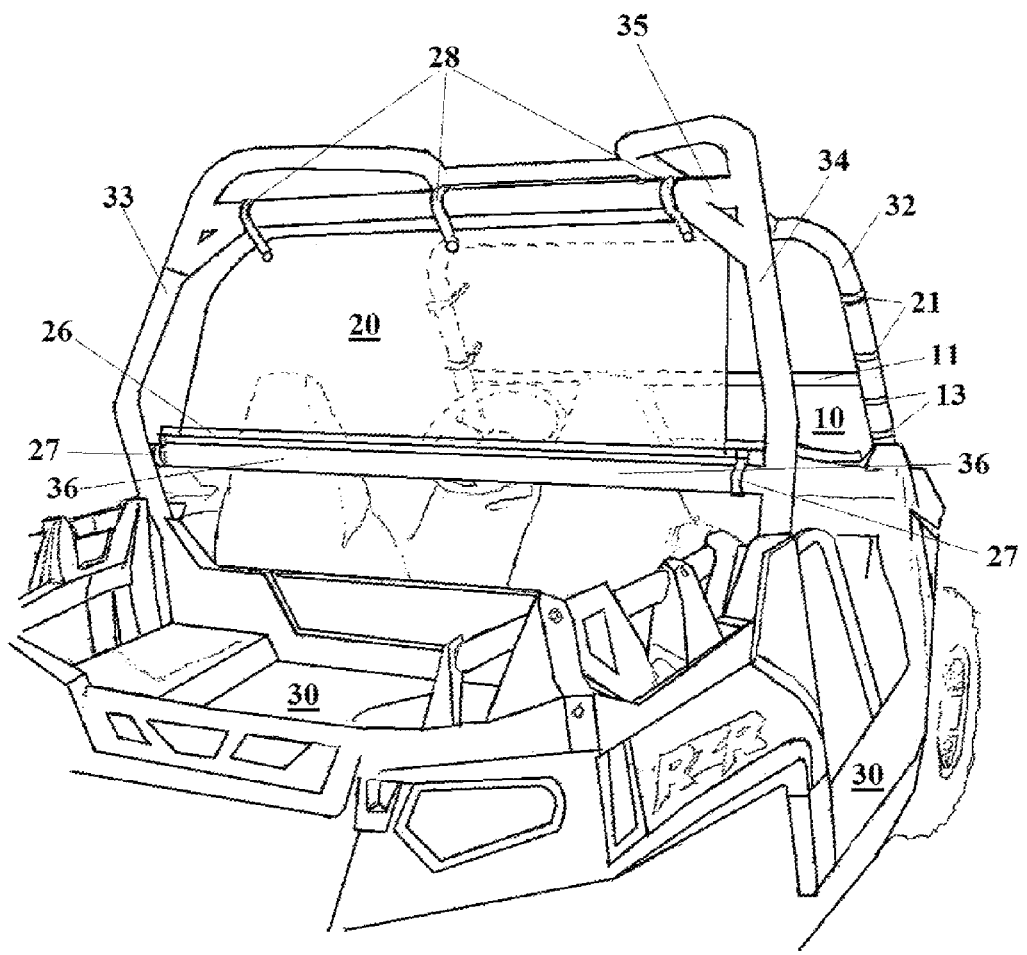
FIG. 8 shows a rear plan perspective view of a UTV (Utility Terrain Vehicle) split windshield with the upper section windshield in a storage position in the rear storage channel behind the vehicle side by side seats.

FIG. 8 shows a rear view of the upper windshield 20 placed in the upper windshield storage channel 26 (rear window position) and secured in place by the upper clamps 28 attached to the rear upper horizontal roll cage bar 35. The clamps 28 using the "threaded portion of the bolt" forward and held by the removable rubber coated retainer nuts 25. It also shows the connection points of the clamps 27 connected to each end of the upper windshield storage channel 26 and the connection of those same clamps to the rear lower horizontal roll cage bar 36.

I claim a utility terrain vehicle removable windshield assembly comprising of:

1. A split windshield assembly, comprising:
   a lower windshield subassembly;
   a removable upper windshield subassembly; and
   a storage channel,
   wherein the lower windshield subassembly comprises
      a lower windshield,
      a lower windshield clamp assembly, and
      an upper windshield support, and
   wherein the upper windshield subassembly comprises
      an upper windshield, and
      a quick disconnect upper windshield clamp assembly, and
   wherein the upper windshield is supported by the upper windshield support when used at a front of a vehicle, and the upper windshield is supported by the storage channel when used at a rear of the vehicle.

2. The split windshield assembly of claim 1, wherein the lower windshield comprises a forward lip at a top edge of the lower windshield.

3. The split windshield assembly of claim 2, wherein the forward lip extends a full width of the lower windshield, has a width of approximately 1 inch, and is angled toward the front of the vehicle at about 45 degrees from the lower windshield.

4. The split windshield assembly of claim 2, wherein the upper windshield support is attached near a middle of the forward lip.

5. The split windshield assembly of claim 1, wherein the lower windshield subassembly further comprises a seal.

6. The split windshield assembly of claim 5, wherein the seal comprises a compliant material between a bottom edge of the lower windshield and a hood of the vehicle.

7. The split windshield assembly of claim 1, wherein the lower windshield clamp assembly attaches the lower windshield to a vertical roll cage bar at the front of the vehicle.

8. The split windshield assembly of claim 7, wherein the lower windshield clamp assembly provides a semi-permanent attachment of the lower windshield to the vertical roll cage bar at the front of the vehicle.

9. The split windshield assembly of claim 1, wherein the storage channel is clamped at its ends to vertical roll cage bars at the rear of the vehicle.

10. The split windshield assembly of claim 9, wherein the upper windshield is further supported by clamps between an upper edge of the upper windshield and a horizontal roll cage bar when supported by the storage channel at the rear of the vehicle.

* * * * *